United States Patent
Hunter et al.

(10) Patent No.: US 9,990,264 B2
(45) Date of Patent: Jun. 5, 2018

(54) GRAPHIC PERFORMANCE MEASUREMENT SYSTEM

(71) Applicant: Invensys Systems, Inc., Foxboro, MA (US)

(72) Inventors: Robert Hunter, Orange, CA (US); James McIntyre, San Jose, CA (US); R. Christopher Coble, Ladera Ranch, CA (US)

(73) Assignee: Schneider Electric Software, LLC, Lake Forest, CA (US)

( * ) Notice: Subject to any disclaimer, the term of this patent is extended or adjusted under 35 U.S.C. 154(b) by 372 days.

(21) Appl. No.: 14/568,715

(22) Filed: Dec. 12, 2014

(65) Prior Publication Data

US 2016/0170567 A1 Jun. 16, 2016

(51) Int. Cl.
  *G06F 9/44* (2018.01)
  *G06F 11/30* (2006.01)
  *G06F 11/34* (2006.01)
  *G06F 11/32* (2006.01)

(52) U.S. Cl.
  CPC .......... *G06F 11/3024* (2013.01); *G06F 11/32* (2013.01); *G06F 11/3428* (2013.01); *G06F 11/3419* (2013.01); *G06F 2201/865* (2013.01); *G06F 2201/88* (2013.01)

(58) Field of Classification Search
  CPC .................................................... G06F 3/0481
  See application file for complete search history.

(56) References Cited

U.S. PATENT DOCUMENTS

| | | |
|---|---|---|
| 5,655,074 A | 8/1997 | Rauscher |
| 7,743,365 B2 | 6/2010 | Wehrs et al. |
| 8,171,459 B2 | 5/2012 | Oja et al. |
| 8,495,605 B2 | 7/2013 | Joshi et al. |
| 8,527,239 B2 | 9/2013 | Sowerby et al. |
| 8,566,803 B2 | 10/2013 | Branson et al. |
| 8,887,085 B1 * | 11/2014 | Cox .................... G06F 3/04855 715/786 |
| 2007/0300215 A1 | 12/2007 | Bardsley |
| 2011/0054878 A1 * | 3/2011 | Zhang ................. G06F 11/3419 703/21 |
| 2011/0302235 A1 * | 12/2011 | Monk ............... G06F 17/30905 709/203 |
| 2013/0179767 A1 * | 7/2013 | Bajric ................. G06F 17/2247 715/234 |
| 2015/0039942 A1 * | 2/2015 | Che ..................... G06F 11/3612 714/38.1 |
| 2015/0242379 A1 * | 8/2015 | Kuivinen ................ H04L 67/42 715/234 |

* cited by examiner

*Primary Examiner* — Hang Pan
(74) *Attorney, Agent, or Firm* — Senniger Powers LLP

(57) ABSTRACT

A Graphic Performance Index (GPI) for increasing performance of graphics in a process control system graphical user interface (GUI). A GUI is built from GUI elements for use on a device. Determining an element load time for each GUI element based a hardware profile of the device permits calculating a total load time of all the element load times of the GUI elements. And the load time is mapped to a GPI scale. Based on the GPI, the GUI elements of the GUI are altered to improve the performance of the GUI.

26 Claims, 3 Drawing Sheets

GRAPHIC PERFORMANCE MEASUREMENT SYSTEM

BACKGROUND

Aspects of the present invention generally relate to the field of graphical user interface (GUI) design, particularly in the scope of process control software. Process control systems are largely controlled by computers running complex software and it is important that the software is reliable and usable by operators.

Process control system GUI's often represent things that may be happening in a plant or factory by graphically displayed pictures that represent individual machines or groups in a process. The pictures or elements representing the machines have become more and more interactive in an effort to provide an intuitive experience to users. However, this increases the complexity of the pictures and the GUI which contains those pictures as a whole. For instance, some pictures may include changing colors or animations to indicate certain operations are occurring in a graphical way. A given GUI element may receive data from many different sources for display and it may also run scripts or do data processing as it receives the data to present it on the GUI in a desirable way.

With the growing complexity of process control system GUI's, performance of the GUI's has become an important consideration. When time sensitive information is being sent to a GUI for display to an operator, it is vital that the GUI meant to display that information does it in a timely manner. The more complex the GUI elements of a GUI are, the longer that GUI will take to load to the screen, creating lag in the system based purely on the GUI design. To the engineers who design a GUI, it is not always clear how a GUI will perform at runtime while they are building it. Additionally, a GUI may be run on different systems with different hardware, which may significantly affect the performance of the GUI. If the system has a very powerful processor and other hardware, a GUI may load in an acceptable amount of time, but if that GUI were to be run on a less powerful device (for instance, a tablet or mobile phone), the GUI may run slowly and be difficult to use.

A system that measured or estimated the likely performance of a GUI on different hardware platforms while the GUI was being built would enable a GUI designer to receive concrete performance information and take that into account while designing in an effort to ensure good performance of the GUI when the design is complete.

SUMMARY

In one form, a system for increasing performance of graphics in a process control system graphical user interface (GUI) is described. The system comprises a processor and one or more memory storage devices. The memory storage devices store processor executable instructions that, when executed, enable the creation of a GUI and improvement of the performance of the GUI. The instruction comprise building a GUI from GUI elements for use on a device and determining an element load time for each GUI element based a hardware profile of the device. A total load time of all the element load times of the GUI elements is calculated and then mapped to a Graphic Performance Index (GPI) scale. Based on the GPI, the GUI elements of the GUI are altered to improve the performance of the GUI.

In another form, a processor executable method is provided.

DETAILED DESCRIPTION

Figure 1:
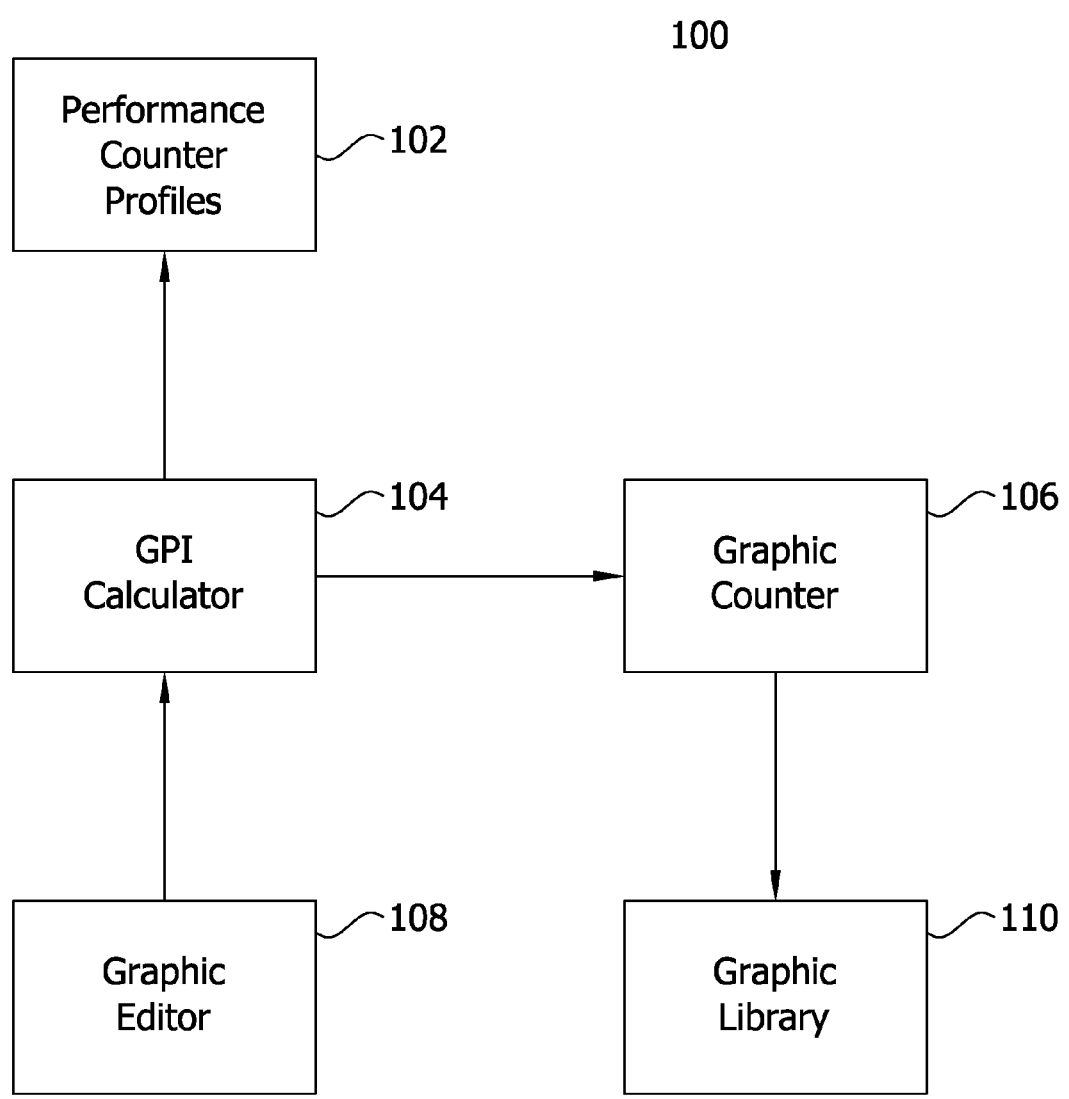
FIG. 1 is a module diagram displaying the modules that make up the Graphic Performance Index system.

The described system provides performance information to an application design engineer and aids the engineer in creating high performance graphics for use in a process control system. The system includes one or more computer devices on which the design engineer may create the desired graphics or Graphical User Interface (GUI). As the engineer is building the GUI or once the engineer has completed the GUI, the system may provide the engineer with information describing the probable performance of the graphics within the GUI. This information may include a Graphics Performance Index (GPI), which communicates to the engineer a basic performance rating of the graphics or GUI. Additionally, the information may include performance data based on type of graphics, animation, or scripts that are executed with respect to the graphics. The provision of this information enables the engineer to determine which areas or types of graphics may cause performance issues and the engineer may then alter the GUI to improve the performance of the graphics. The system may also provide suggestions based on the data of actions the engineer may take to improve the performance of the GUI. The engineer may also give the system a command to automatically make certain changes to the GUI that will improve performance based on the GPI and performance information.

The GPI and performance information is based on the hardware profile of the system that will execute the GUI at runtime and may also be based on a particular software rendering engine that affects performance. A GUI may have different performance information and GPI on different hardware or when rendered using different software engines. A design engineer may create separate hardware and software profiles representing all the systems that the GUI is likely to be executed on and determine the GPI and performance for each profile. The system or engineer may then attempt to alter the GUI to perform efficiently on many different possible platforms. For instance, the performance of a GUI may be different between a desktop PC application and a tablet or a mobile phone or even a web-based interface.

The Graphics Performance Index (GPI) may be calculated by the system based on the "call up time", which is the amount of time between the user or system requesting to show a graphic and the graphic being presented on the screen with live data. Many different factors may contribute to "call up time" of a graphic and these may be considered when calculating the GPI. A graphic can be very complex, and this complexity is a leading cause of slow "call up time" or a poor GPI. A GPI rating is abstracted away from providing an actual time value as it is meant to give a general idea of the performance of the graphic and actual "call up times" may vary greatly based on a variety of factors during runtime. GPI is a unitless general purpose performance indicator. For instance, GPI may be defined to be on a scale from 0 to 5, with 5 indicating excellent performance and 0 indicating abysmal performance. The amount of call up time that each step in the scale represents may vary, depending on what is expected from the GUI. For instance, a GPI of 5 may indicate that a graphic will often have less than one second of call up time, while a GPI of 0 may indicate that a graphic will often have a call up time of greater than ten seconds.

The system calculation of GPI may occur at any time throughout the graphic design process. A user may invoke the GPI calculation repeatedly while they are designing a graphic in order to monitor changes to the performance of that graphic based on the alterations they are making. The GPI calculation may also be configured to occur automatically throughout the design process. For instance, the GPI calculation may occur automatically every time the graphic is saved by the user or on whenever a set amount of time passes.

Each time the GPI is calculated a graphics performance report may be provided to the user. This may be in the form of a popup window or other means of communication (e.g., email). The report may include the GPI and a variety of other performance information, including performance data pertaining to the sub-parts of the graphic. The performance information may be sorted into types or other division to give the user information that may indicate if there is a particular area or type of sub-part in the design that may be causing a large drop in performance. Alternatively, if the GPI is calculated to indicate excellent performance, the report may not appear, or simply indicate that the graphic being designed is likely to perform very efficiently.

FIG. 1 shows a diagram representing the modules involved in calculating a GPI and the relationships between the modules. System 100 is made up of a performance counter profile module 102, a GPI calculator module 104, a graphic counter module 106, a graphic editor module 108, and a graphic library module 110. Each of these modules may be executed on a single device, or they may be executed on a plurality of devices which are communicatively coupled. For instance, the performance counter profile module 102 may be stored on a server separate from the rest of the system and called upon to provide particular performance counter profile modules. As another example, the system may include several different graphic editor modules on multiple machines that are connected to the system in such a way that they access a GPI server that is made up of the performance counter profile module 102, GPI calculator module 104, and graphic counter module 106.

The performance counter profile module 102 stores and provides performance counter profiles to the GPI calculator 104. Performance counter profiles may include information about the hardware of a related device and benchmarked performance costs of graphic elements when being called up by that hardware. The graphic counter module 106 counts the graphic elements of a graphic being produced in the graphic editor module 108, keeping track of the type of the elements being counted and provides that information to the GPI calculator 104. The graphic counter module 106 retrieves information from the graphic library 110 about the graphic elements in order to determine an accurate count of the graphic elements. The GPI calculator 104 combines the information from the performance counter profile module 102 and the graphic counter module 106 to determine an estimated call up time of the graphic when considering the benchmark performance costs of each of the counted graphic elements. The GPI calculator 104 then maps the estimated call up time to a value in the GPI scale. The mapped GPI value along with other performance information gathered through this process may be provided to the graphic editor module 108 to inform a designer of the performance of the graphic. Additionally, the GPI calculator module 104 may provide the designer at graphic editor module 108 with suggestions as to how to improve performance, or it may make automatic performance upgrades to the graphic based on the GPI and other performance information.

The graphic counter module 106 accesses the graphic library module 110 and obtains data from the graphic library module 110 to count the appropriate graphic elements present in a graphic. Graphic elements in a graphic may include lines, rectangles, ellipses, curves, text boxes, buttons, etc. Graphics can be nested in other graphics, such that the graphic counter module 106 may step into a graphic to count the graphic elements of embedded graphics. Table 1 shows a list of exemplary graphic element types that may be counted by the graphic counter module 106.

TABLE 1

Exemplary Graphic Element Types

Line
Rectangle
RoundedRectangle
Ellipse
Button
PolyLine
Curve
Polygon
ClosedCurve
Image
Arc (Note: 2 and 3 point together
Pie (Note: 2 and 3 point together
Chord (Note: 2 and 3 point together
Text
TextBox
Status
RadioButton
CheckBox
EditBox
ComboBox
Calendar
DateTime
ListBox
EmbeddedSymbol
Group
Path
ClientControl
Trend Pens Graphic elements may have additional features which may also be counted by the graphic counter module 106 if they affect performance of the system. For instance, a graphic element may have a type of "fill", which may include filling with a solid color or with a pattern. Other fills may use transparency. Graphic elements may also include animation effects which may also be counted by the graphic counter module 106. Table 2 shows a list of exemplary fills that may be counted and Table 3 shows a list of exemplary animation effects that may be counted by the graphic counter module 106.

TABLE 2

Exemplary Fills

Solid Fills (Fill or Line usage)
Pattern Fills (Fill or Line usage)
Texture Fills (Fill or Line usage)
Linear Gradient Fills (Fill or Line usage)
Radial Gradient Fills (Fill or Line usage)
Fills which use a Transparency TABLE 2-continued Exemplary Fills Line Patterns
Line Ends

TABLE 3

Exemplary Animations

UserInput
LineColor
FillColor
TextColor
PercentFill (Vertical & Horizontal together)
ValueDisplay
Orientation
Visibility
Disable
ShowGraphic
HideGraphic
Location (Vertical & Horizontal together)
Size (Width & Height together)
ActionScript
Slider (Vertical & Horizontal together)
Tooltip
PushButton
Blink
Point
Element Style
Alarm Border A graphic element may have a flag that indicates whether or not the element is visible during runtime. If the graphic element will not be visible during runtime and therefore not take any additional time to call up, the graphic element may be ignored by the graphic counter module 106.

The graphic counter module 106 may also count references made by a graphic element to something else in the system. References may represent an additional cost during call up due to any additional time it may take for the reference to be resolved. If there are duplicate references between the elements or on a single element, the graphic counter module 106 may remove the duplicate references.

Custom properties may be added to a graphic element that may have an effect on the performance of the graphic. The graphic counter module 106 may also count these custom properties during the counting phase. Custom properties may be counted multiple times, even if there are duplicates.

A graphic may include executable scripts that will be executed on startup. Scripts may be counted by the graphic counter module 106. A script may contain references that need to be resolved upon execution, and each reference may incur additional performance cost. In an embodiment, a reference that is used multiple times in the same script may only be counted once for that script. Certain scripts may be more likely to be counted than others. For instance, an "OnShow" script, which executes during the process of showing the graphic, is important to count to determine an accurate performance value. Scripts that are counted may also be divided into separate groups based on the size or number of lines in the script. For instance, scripts with 10 lines or less may be counted in one group, while scripts with 10 lines or more are counted in a second group. As many of these divisions may be used as necessary to accurately determine the probable performance cost of the scripts of a graphic. Scripts that do not execute on call up of the graphic may not be counted.

The performance counter profile module 102 creates and stores profiles which enable the GPI calculator 104 to give weight to the performance affect caused by each of the counted graphic elements. The profiles stored by the performance counter profile module 102 may be stored on the system by any method that data is typically stored. For instance, the profiles may be stored in the form of XML files. A profile may contain information about the hardware of a device and benchmark data for each type of graphic element to be counted. Each profile may also include a baseline measured time, which represents the average time that the represented device takes to call up an essentially empty graphic. This baseline measured time may then be used to isolate the time taken to load additional graphic elements which are included later.

The types of graphic elements included in the profile may include a benchmark time. For example, the benchmark time is the total time taken to load a graphic made up of only graphic elements of the referenced type. In order to obtain an accurate average load time, a large number of the graphic elements may be used for the benchmarking process. The profile may also include the number of graphic elements that were used to set the benchmark time, so that the GPI calculator may divide the measured time by the number of loaded graphic elements in order to determine an average time for a single graphic element of that type. Additionally, the graphic element type on the profile may include a description which will be displayed to a user on the GUI when observing the results of the analysis, and it may include a mitigation field, which may provide a description of how a performance issue may be remedied if the referenced graphic element type is indicated as an issue.

As an example of benchmarking a graphic element type, a performance counter profile module 102 may be creating a profile for a device and determining a benchmark for a "rectangle" type of graphic element. 10,000 rectangles may be added to a graphic to create a test graphic. The test graphic is then loaded in runtime while the length of the load time is monitored. When the load time is determined, it may be used along with the total number of rectangles added to determine an average load time for rectangles on the device. Multiple benchmarks may be executed as necessary to ensure an accurate benchmark value.

The GPI calculator 104 calculates the GPI and may provide a GPI report to a user on the graphic editor 108. The GPI calculator 104 acts as the interface for interacting with the graphic performance measurement system. The GPI calculator 104 receives a counter profile from the performance counter profile module 102 and counter information about a graphic from the graphic counter module 106. From the counter profile, the GPI calculator determines the average benchmark time of calling up each graphic element on the graphic. The average benchmark times are multiplied by the number of each of the graphic elements on the graphic which results in a total graphic element call up time. A base call up time representing the time it takes to call up an empty graphic may be added to the total graphic element call up time in order to find the total call up time of the graphic. The GPI calculator may then map the total call up time to a GPI value scale, as described above.

The graphic editor module 108 may comprise a GUI used by an engineer for designing graphics for use in a process control system. The GUI may include a button or other method of interaction that allows a user to trigger calculation of a GPI and generation of a GPI report for a selected graphic. The graphic editor module 108 may also include a shortcut key sequence which triggers a GPI calculation. When the GPI function is activated, the GPI and GPI report may appear on the graphic editor module 108 in the form of a modal window displaying the GPI information. Additionally, GPI information may be included in a status bar form on the GUI, enabling a user to monitor GPI of a graphic as they build the graphic on the graphic editor module 108. The GPI calculation may be executed repeatedly based on a time interval or when a change is made to the graphic which may affect the performance of the graphic. For instance, when a change is made to a graphic, the system may wait for a 15 second delay and then execute the GPI calculation. The system may also detect when the user has been idle for a period of time and execute a GPI calculation after that period of time. Additional alterations to the graphic during the idle time may result in a reset of the time for executing a GPI calculation.

Figure 2:
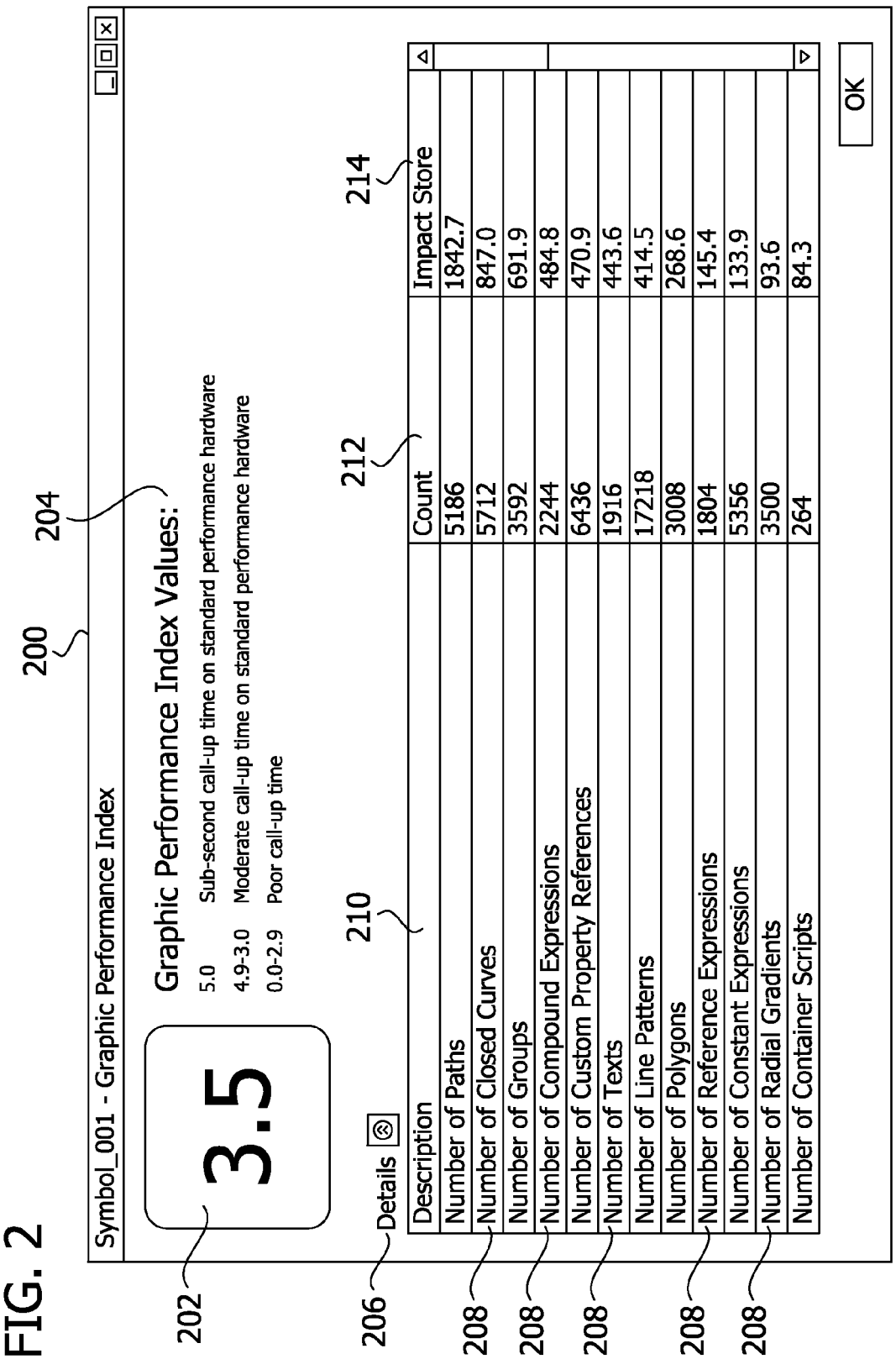
FIG. 2 is an exemplary screenshot of a Graphic Performance Index report.

FIG. 2 shows an exemplary GPI report 200 that may appear when the GPI is calculated. On the GPI report 200, a calculated GPI 202 is displayed prominently on the screen to provide an easily understood summary of the performance of the current graphic. An index explanation section 204 may be present in the report to ensure that users understand the meaning of the calculated index 202. The report 200 may include a details section 206, which may initially be minimized. The details section 206 may be maximized in order to view more detailed information about the performance of the graphic based on GUI element types 208. Each row of the section 206 may include the name of the element type 210, the total count of that element type in the graphic 212, and an impact score 214, which may be measure in milliseconds of load time. The section 206 may be sorted by largest impact initially, but the sorting may be altered by user action to render in a different order (e.g. alphabetically, largest count, etc.). The columns may also be reverse sorted. The elements 208 that are included in the section 206 may be limited to those elements that have a performance impact. Elements which have a zero or nearly zero impact score may not be present in section 206. A GPI report 200 may appear in a dialog box or other similar graphic format. It may also be available in the form of an email or printout. A GPI report 200 dialog box may be resized by a user as desired.

If the GPI of a graphic is calculated to be less than a certain level of performance, a warning message may be delivered to a user. The warning may be in the form of a popup window or other method of user interaction. The warning may allow the user to open a GPI report to obtain additional information about the GPI calculation and it may also contain specific areas or element types that are lower performance or suggested changes that may be made to the graphic to improve the performance. For instance, it may suggest disabling some amount of graphic elements, or disabling complex scripting behavior from the graphic. A user may be able to disable the GPI warning if they do not wish to see it.

Figure 3:
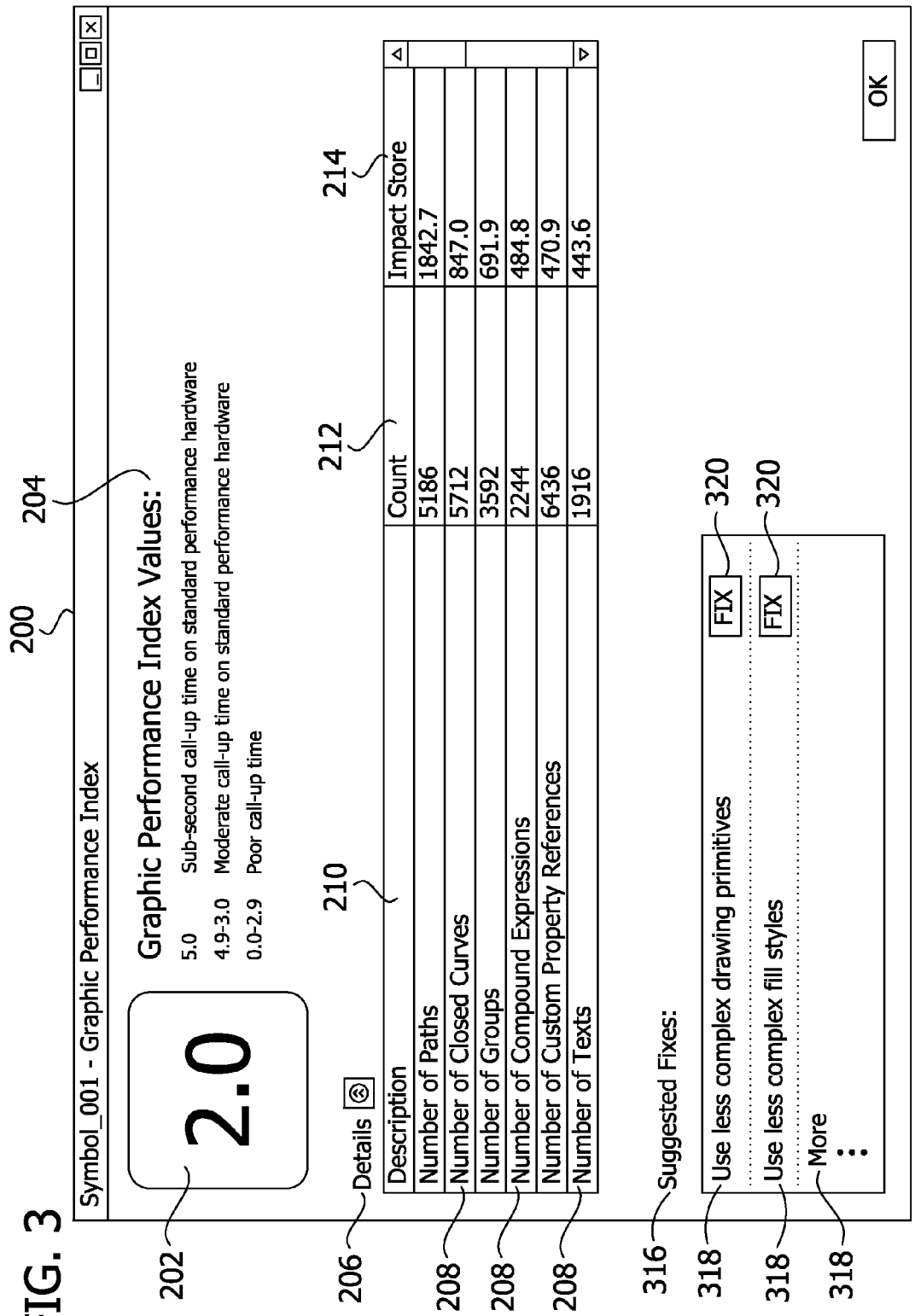
FIG. 3 is an exemplary screenshot of a GPI report including a suggestion section.

FIG. 3 shows an exemplary GPI report 300 including all of the elements of the GPI report 200 of FIG. 2, but also including a suggestion section 316. The suggestion section 316 contains suggestions 318 which the system determines based on the GPI calculation. A suggestion 318 may point out what aspects of the GUI are impacting the performance of the GUI significantly and make a suggestion statement telling a user what may be done. The suggestion 318 may also include a button or link 320 which may be used to quickly navigate to the proper section of the GUI in order to make changes according to the suggestion statement. If a GUI performs sufficiently well, there may be no suggestions 318 in the suggestion section 316. On the other hand, if a GUI performs poorly, the suggestions section 316 may contain several suggestions 318. The suggestions section 316 may allow a user to scroll in order to see all of the suggestions 318 if there are too many to fit into the initial GPI report 300 window.

A user may execute a GPI analysis on all of the graphics on a given screen as a whole, or they may select a sub-set of the present graphics to analyze. This allows a user to drill down on the graphics and determine problem areas more specifically.

The Abstract and Summary are provided to help the reader quickly ascertain the nature of the technical disclosure. They are submitted with the understanding that they will not be used to interpret or limit the scope or meaning of the claims. The Summary is provided to introduce a selection of concepts in simplified form that are further described in the Detailed Description. The Summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and process without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow.

The specification and drawings are accordingly to be regarded in an illustrative rather than restrictive sense.

What is claimed is:

1. A method for increasing, during a graphic design process, performance of graphics in a process control system graphical user interface, the method comprising:
    building, via a graphic editor module, a graphical user interface (GUI) for use on a device, the GUI including a plurality of GUI elements;
    obtaining, by a graphic counter module, visibility data for each of the plurality of GUI elements from a graphic library module, said visibility data indicating whether each GUI element is visible when the GUI is loaded on a display of the device during runtime;
    determining, by a performance counter profile module, an element load time for each of the GUI elements, said element load time representing an estimated time for the GUI element to be loaded on the display of the device during runtime based on a hardware profile of the device;
    calculating, by a Graphic Performance Index calculator, a total load time for the plurality of GUI elements, said total load time representing a sum of the element load times from the plurality of GUI elements;
    discounting from the calculated total load time, by the Graphic Performance Index calculator, a load time of each GUI element of the plurality of GUI elements having visibility data indicating that said GUI element is not visible during runtime;
    mapping, by the Graphic Performance Index calculator, the discounted total load time to a Graphic Performance Index (GPI), said GPI representing a rating of the performance of loading the visible GUI elements using the device; and
    altering, via the graphic editor module, the visible GUI elements based on the GPI and element load times, said altering improving the performance of the GUI.

2. The method of claim 1, wherein determining the element load time for each of the GUI elements comprises finding, by the performance counter profile module, a benchmark load time for a first GUI element by measuring the time taken to load a GUI made up of a plurality of the first GUI element and dividing the measured time by the number of the first GUI element loaded on the GUI.

3. The method of claim 1, wherein determining the element load time for each of the GUI elements comprises determining, by the performance counter profile module, execution time for a script executed by a GUI element.

4. The method of claim 1, wherein determining the element load time for each of the GUI elements comprises determining, by the performance counter profile module, load time for an animation of a GUI element.

5. The method of claim 1, wherein determining the element load time for each of the GUI elements comprises determining, by the performance counter profile module, load time for a style of a GUI element.

6. The method of claim 1, wherein determining the element load time for each of the GUI elements comprises determining, by the performance counter profile module, load time of a custom property of a GUI element.

7. The method of claim 1, further comprising determining, by the performance counter profile module, an element load time for each of the GUI elements based on a second hardware profile of a second device.

8. The method of claim 1, wherein calculating the total load time for the plurality of GUI elements is initiated by a user action.

9. The method of claim 1, wherein calculating the total load time for the plurality of GUI elements is automatically initiated by a device.

10. The method of claim 1, further comprising presenting a GPI report comprising a GPI and performance information to a user via the graphic editor module on a display device.

11. The method of claim 1, wherein determining the element load time for each of the GUI elements comprises determining, by the performance counter profile module, that a GUI element of the plurality of the GUI elements contains a nested GUI element, determining, by the performance counter profile module, an element load time of the nested GUI element, and including the nested GUI element load time in the determined element load time of the GUI element of the plurality of the GUI elements.

12. The method of claim 1, wherein the total load time comprises a base load time representing time taken to load a blank GUI based on the hardware profile of the device.

13. A system for increasing, during a graphic design process, performance of graphics in a process control system graphical user interface, the method comprising:
 a processor;
 a display device coupled to the processor;
 one or more memory storage devices coupled to the processor, said one or more memory storage devices storing processor-executable instructions, said processor-executable instructions comprising instructions for:
  building, via a graphic editor module, a graphical user interface (GUI) for use on a device, said GUI including a plurality of GUI elements, and said GUI stored on the one or more memory storage devices;
  obtaining, by a graphic counter, visibility data for each of the plurality of GUI elements from a graphic library module, said visibility data indicating whether each GUI element is visible when the GUI is loaded on a display of the device during runtime, said graphic library module being stored on the one or more memory storage devices;
  determining, by a performance counter profile module, an element load time for each of the GUI elements, said element load time representing an estimated time for the GUI element to be loaded on the display of the device during runtime based on a hardware profile of the device, said element load times being stored on the one or more memory storage devices;
  calculating, by a Graphic Performance Index calculator, a total load time for the plurality of GUI elements, said total load time representing a sum of the element load times from the plurality of GUI elements;
  discounting from the calculated total load time, by the Graphic Performance Index calculator, a load time of each GUI element of the plurality of GUI elements having visibility data indicating that said GUI element is not visible during runtime;
  mapping, by the Graphic Performance Index calculator, the discounted total load time to a Graphic Performance Index (GPI), said GPI representing a rating of the performance of loading the visible GUI elements using the device; and
  displaying, via the graphic editor module on the display device, the calculated GPI.

14. The system of claim 13, wherein determining the element load time for each of the GUI elements comprises finding, by the performance counter profile module, a benchmark load time for a first GUI element by measuring the time taken to load a GUI made up of a plurality of the first GUI element and dividing the measured time by the number of the first GUI element loaded on the GUI.

15. The system of claim 13, wherein determining the element load time for each of the GUI elements comprises determining, by the performance counter profile module, execution time for a script executed by a GUI element.

16. The system of claim 13, wherein determining the element load time for each of the GUI elements comprises determining, by the performance counter profile module, load time for an animation of a GUI element.

17. The system of claim 13, wherein determining the element load time for each of the GUI elements comprises determining, by the performance counter profile module, load time for a style of a GUI element.

18. The system of claim 13, wherein determining the element load time for each of the GUI elements comprises determining, by the performance counter profile module, load time of a custom property of a GUI element.

19. The system of claim 13, further comprising determining, by the performance counter profile module, an element load time for each of the GUI elements based on a second hardware profile of a second device.

20. The system of claim 13, wherein calculating the total load time for the plurality of GUI elements is initiated by a user action.

21. The system of claim 13, wherein calculating the total load time for the plurality of GUI elements is automatically initiated by a device.

22. The system of claim 13, further comprising presenting a GPI report comprising a GPI and performance information to a user via the graphic editor module on a display device.

23. The system of claim 13, wherein determining the element load time for each of the GUI elements comprises determining, by the performance counter profile module, that a GUI element of the plurality of the GUI elements contains a nested GUI element, determining, by the performance counter profile module, an element load time of the nested GUI element, and including the nested GUI element load time in the determined element load time of the GUI element of the plurality of the GUI elements.

24. The system of claim 13, wherein the total load time comprises a base load time representing time taken to load a blank GUI based on the hardware profile of the device.

25. The system of claim 13, the instructions further comprising instructions for altering, via the graphic editor module, the plurality of GUI elements based on the GPI and element load times, said altering improving the performance of the GUI.

26. The system of claim 13, the instructions further comprising instructions for displaying, via the graphic editor module on the display device, suggestions for actions that, when taken, may improve the GPI and performance of the GUI.

* * * * *